H. W. OSTER.
DIE STOCK FOR CUTTING TAPERED THREADS.
APPLICATION FILED FEB. 12, 1908.

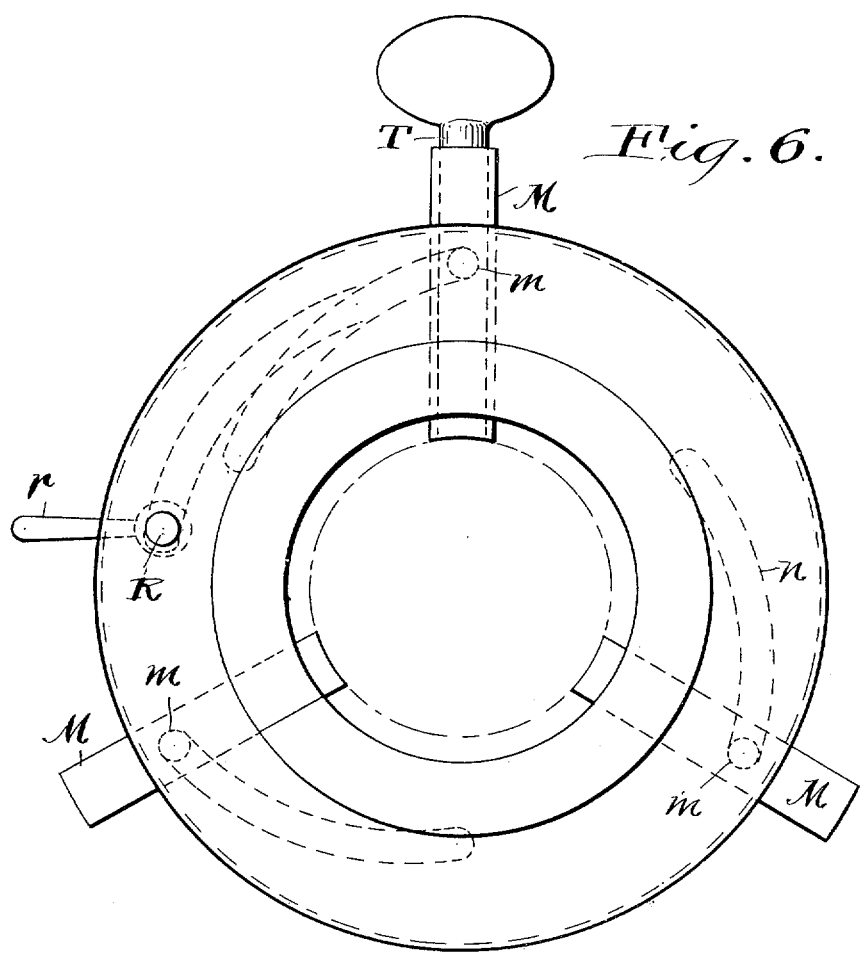
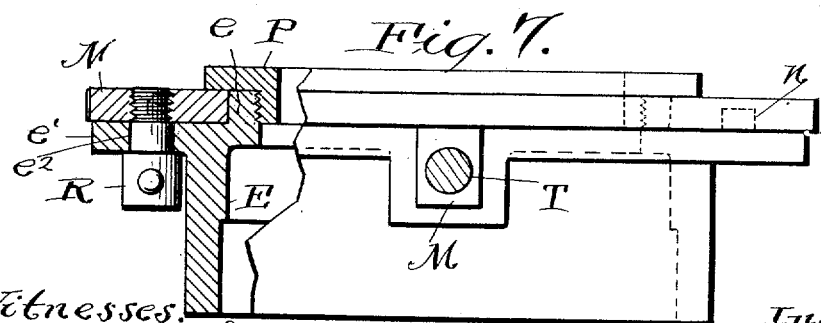

977,539.

Patented Dec. 6, 1910.
5 SHEETS—SHEET 5.

Witnesses
E. B. Gilchrist
H. R. Sullivan

Inventor
Herman W. Oster
By Thurston & Woodward
Attorneys

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-STOCK FOR CUTTING TAPERED THREADS.

977,539.  Specification of Letters Patent.  Patented Dec. 6, 1910.

Application filed February 12, 1908. Serial No. 415,480.

*To all whom it may concern:*

Be it known that I, HERMAN W. OSTER, a citizen of the United States, residing at Cleveland, in the county of Cuyahoga and State of Ohio, have invented a certain new and useful Improvement in Die-Stocks for Cutting Tapered Threads, of which the following is a full, clear, and exact description.

This invention has for its object the production of a novel die stock capable of cutting tapered threads, and having a wide range of easily effected adjustment whereby it may be used on pipes of different diameters.

The invention, embodied in an efficient device, is shown in the accompanying drawings and is hereinafter described and definitely pointed out in the claims.

Figure 1:
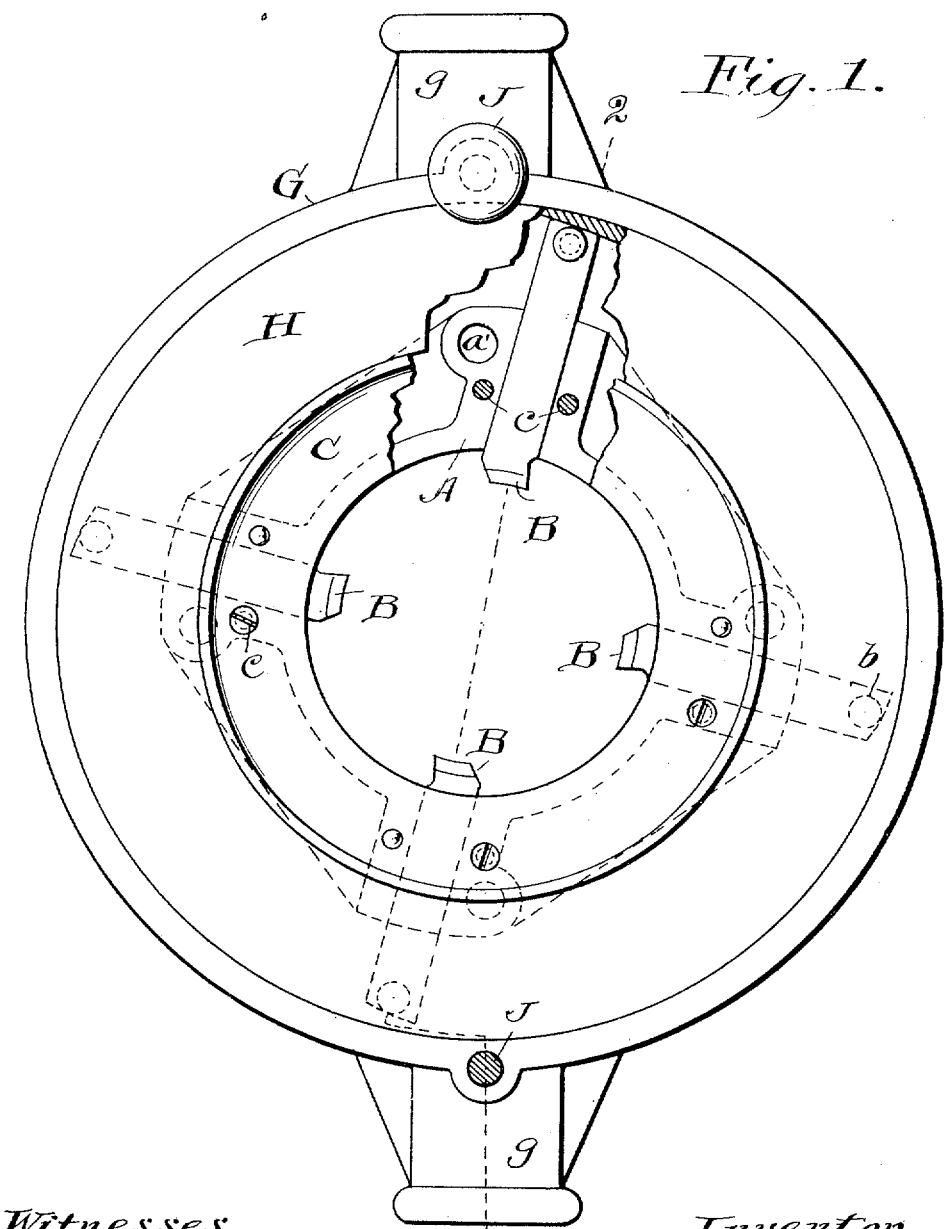
Figure 2:
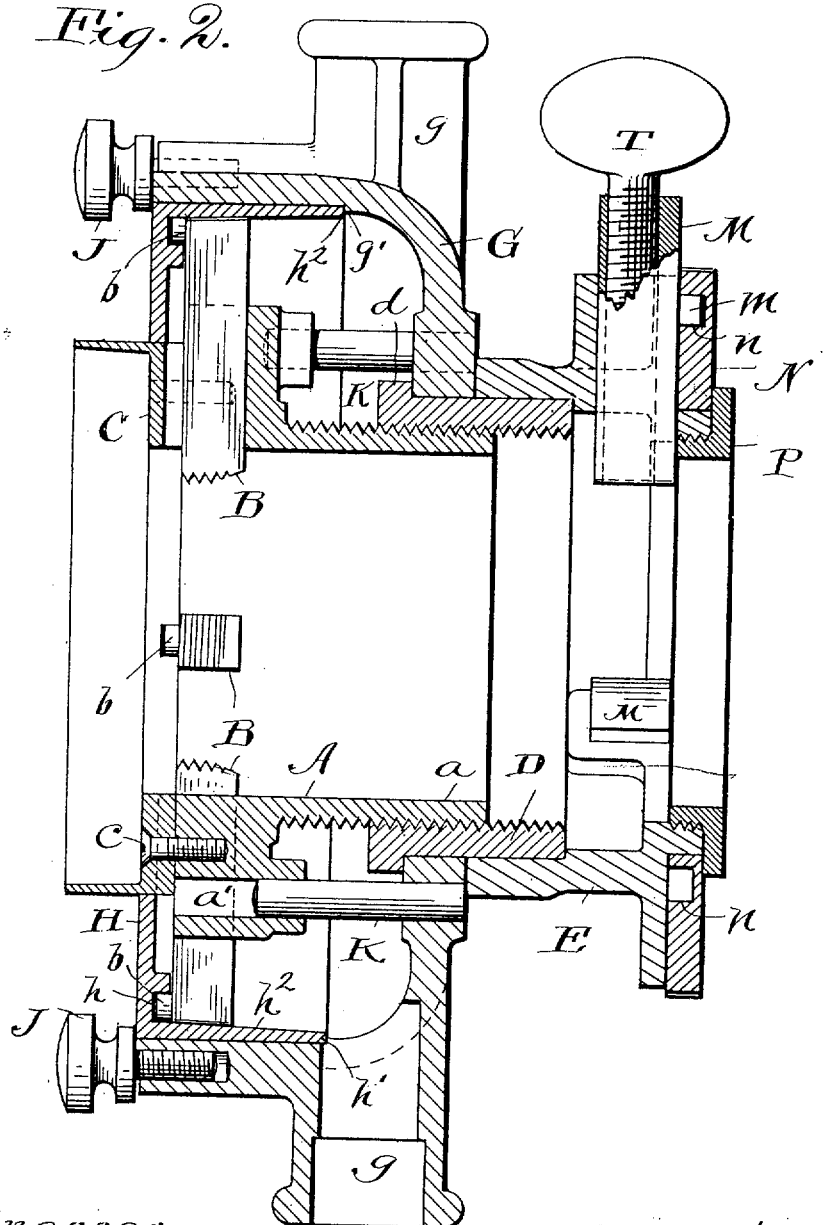
Figure 3:
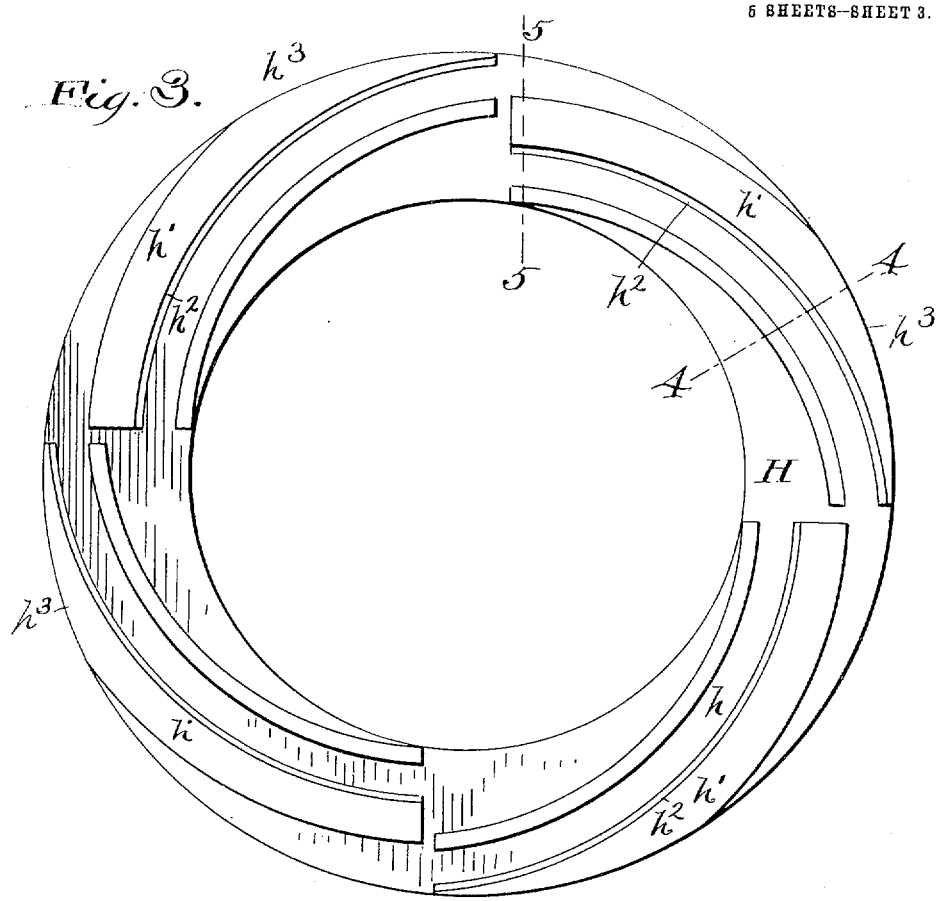
Figure 4:
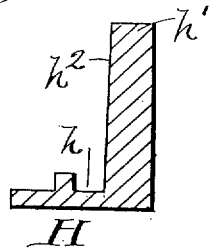
Figure 5:
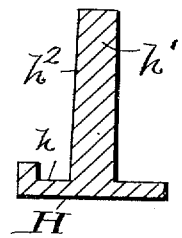
Figure 8:
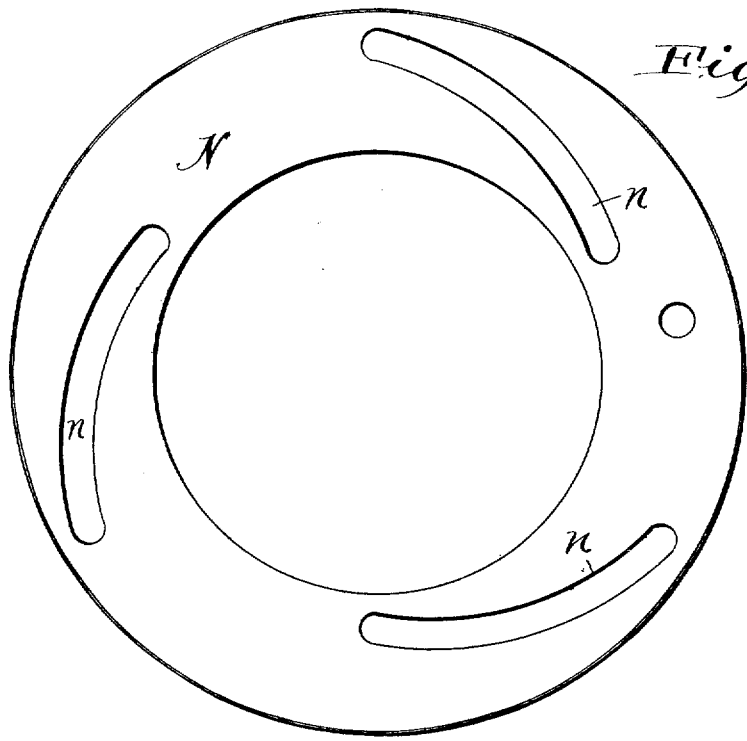
Figure 9:
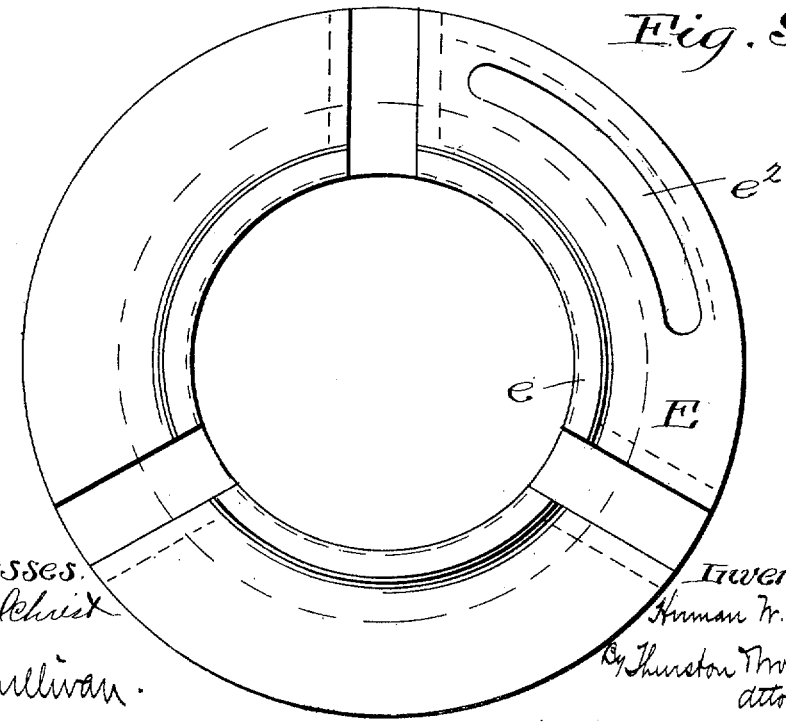

In said drawing Figure 1 is an end view of a die stock embodying the invention with a portion of the cam plate and cap ring broken away. Fig. 2 is a longitudinal sectional view on line 2—2 of Fig. 1. Fig. 3 is a view of the inner face of the cam plate H. Fig. 4 is a sectional view on line 4—4 of Fig. 3; Fig. 5 is a sectional view on line 5—5 of Fig. 3. Fig. 6 is an end view of the clamping part of the device. Fig. 7 is a side view, partly sectioned, of the parts thereon in Fig. 6. Fig. 8 is an end view of the cam plate; and Fig. 9 is an end view of the member E.

Referring to the parts by letters, A represents the die-carrying head, in the end face of which are radial grooves wherein the radially movable dies or chasers B are held by a cap ring C, this ring being secured to the end of the head by screws $c$ or other suitable means. This head is tubular and has a longitudinally extended barrel $a$ which is externally threaded, the pitch of said threads corresponding with the pitch of the cutting threads on the dies. This threaded portion screws into a sleeve D which is fixed to the tubular member E,—these two pieces D and E constituting the work holder. Any suitable means, as for example, such as are hereinafter described, may be employed for fastening the work holder on the pipe to be threaded. The operating ring G is rotatably mounted on said work holder with its lower edge fitted into an annular groove in said work holder, said groove being formed between the end of the member E and an annular flange $d$ on the member D. The ring G may be rotated upon the work holder, but is by reason of the described construction prevented from moving endwise relative thereto. The sockets $g$ formed on this ring are for the reception of handles by which the ring may be turned.

The dies B are adjusted radially in and out by a cam plate H having on its inner face cam grooves $h$,—as many as there are dies. Projections $b$ on the dies extend into these grooves. The outer wall of each of these grooves is formed by a long flange or rib $h'$ whose inner surface $h^2$ is tapered as shown; that is to say, this inner surface is so shaped that any radial plane will intersect it in a line which is inclined to the axis of the head, and which diverges therefrom as it goes away from the cam plate C. A portion of the outer face of each rib $h'$ is cylindrical as at $h^3$, thereby forming an incomplete cylinder which is rotatably mounted in the end of the operating ring G.

To adjust the radial position of the dies, therefore, it is only necessary to turn this cam plate relative to the die carrying head. When the dies have been properly adjusted the cam plate is to be clamped to the ring G. Any suitable means may be employed for this purpose, the means shown consisting of screws J which screw into the ring and have large heads which overhang and engage with the outer face of the cam plate. When the screws are screwed in, the cam plate is clamped between said heads and a little annular flange $g'$ on the ring. It will be noted that the outer ends of the dies are tapered to correspond with the taper of the surfaces $h^2$ against which the outer ends of said dies bear at all times.

Suitable means are provided for compelling the head A and ring G to rotate together, but for permitting the head to move longitudinally relative to the ring. The means employed consist of pins K secured to the ring G in positions parallel with the axis of the head, said pins passing freely through holes $a'$ in the head.

To use the described device the work holder is secured upon the pipe to be threaded. The cam plate is turned to adjust the dies into the proper position and is then clamped to the operating ring. The latter is then turned, but cannot move endwise.

The head A turns with said ring, but since it screws into the work holder must move longitudinally relative thereto. In so moving it carries the dies which, as they move longitudinally relative to the surface $h^2$, are permitted to recede radially, whereby they cut a tapered thread which corresponds with the taper of said surface.

As before stated, any suitable means may be provided for clamping the device upon the pipe to be threaded, but the specific mechanism shown is admirably adapted for the purpose and contains a certain novel feature of construction which it is desired to cover in this patent.

The member E of the work holder is provided, in its end, with radial grooves for the reception of the movable clamping dies M. A cam plate N is rotatably mounted about a cylindrical flange $e$ which is a part of the member E; and this cam plate is held in place by a flanged ring P which is screwed into the flange $e$. The cam plate N has the cam groove $n$ which receives projections $m$ on the dies M. The upper edge of the cam plate N is knurled so that it may be easily turned. A clamping screw R passes up through an arc-shaped slot $e^2$ in the projecting flange $e'$ of the member E and screws into the cam plate N. This screw is provided with an operating handle $r$. When the cam plate has been turned to bring the clamping dies into proper position, it is clamped to the member E by means of the screw R.

There is a longitudinal hole passing entirely through one of the clamping dies M. Through this hole a clamping screw T is screwed. When, by turning the cam plate N, the clamping dies have been moved into engagement with the pipe or other cylindrical device to be threaded, the cam plate is locked in position through the action of the screw R. It is, however, difficult to cause these clamping dies to press with such force upon the pipe that, when the threads are being cut on the pipe, the device will not turn upon said pipe. It is to prevent this action that said screw T is provided; for when the dies M are caused to impinge as tightly as practicable upon the pipe, this set screw is then screwed in and thereby the pipe is clamped so firmly that the device cannot turn thereon.

Having described my invention, I claim:

1. The combination of a tubular threaded work-holder, a die head which has threads engaging with those on said work holder, radially movable dies carried by said head, a cam plate having longitudinally tapered cam surfaces which said dies engage, which plate is capable of being turned relative to said head to adjust the position of said dies, means connecting said head and plate to compel them to rotate in unison, and means preventing the longitudinal movement of said plate.

2. The combination of a tubular threaded work holder, a die head which has threads engaging with those on said work holder, a cam plate capable of being turned relative to said head and having cam grooves, the outer walls of which are tapered, radially movable dies carried by said head having projections which enter said grooves,— the outer ends of said dies being in contact with said tapered surfaces, means compelling the cam plate to turn with said head, and means preventing longitudinal movement of said cam plate.

3. The combination of a tubular threaded work holder, a die head which has threads engaging with those on said work holder, radially movable dies carried by said head, an operating ring rotatably mounted on said work holder, means preventing endwise movement of said ring, a plate having tapered surfaces with which the outer ends of said dies engage, means for fastening said plate to said operating ring, and means transmitting rotary motion from said operating ring to said head.

4. The combination of a tubular threaded work holder, a die head which has threads engaging with those on said work holder, and has longitudinal holes, radially movable dies carried by said head, an operating ring rotatably mounted on said work holder, means preventing endwise movement of said ring, longitudinally extended pins secured to the ring and loosely fitted to said holes, a plate having tapered cam surfaces with which the outer ends of said dies engage, means for fastening said plate to said operating ring, and means transmitting rotary motion from said operating ring to said head.

5. The combination of a tubular threaded work holder, a die head which has threads engaging with those on said work holder, and has longitudinal holes, radially movable dies carried by said head, an operating ring rotatably mounted on said work holder, means preventing endwise movement of said ring, a plate having tapered cam surfaces with which the outer ends of said dies engage, means for fastening said plate to said operating ring, and pins secured to said ring and loosely entering the holes in the die head.

6. The combination of a tubular work holder, a co-axial die head capable of being rotated and of being moved longitudinally relative to the work holder, radially movable dies carried by said head, a co-axial cam plate having longitudinally tapered cam surfaces with which said dies engage, which plate is capable of being turned relative to said die head to adjust the dies, means for connecting said cam plate and die head to compel them to rotate in unison, and means preventing the longitudinal movement of the cam plate relative to the work holder.

In testimony whereof, I hereunto affix my signature in the presence of two witnesses.

HERMAN W. OSTER.

Witnesses:
E. B. GILCHRIST,
H. R. SULLIVAN.